United States Patent
Lee et al.

(10) Patent No.: US 12,436,260 B2
(45) Date of Patent: Oct. 7, 2025

(54) RADAR CONTROL DEVICE AND METHOD

(71) Applicant: HL Klemove Corp., Incheon (KR)

(72) Inventors: Jingu Lee, Ansan-si (KR); Han Byul Lee, Seoul (KR); Jung Hwan Choi, Seoul (KR); Jae Hyun Han, Seoul (KR)

(73) Assignee: HL Klemove Corp., Incheon (KR)

( * ) Notice: Subject to any disclaimer, the term of this patent is extended or adjusted under 35 U.S.C. 154(b) by 398 days.

(21) Appl. No.: 17/984,507

(22) Filed: Nov. 10, 2022

(65) Prior Publication Data
US 2023/0161025 A1   May 25, 2023

(30) Foreign Application Priority Data
Nov. 19, 2021 (KR) .................. 10-2021-0160526

(51) Int. Cl.
  *G01S 13/44* (2006.01)
  *G01S 13/931* (2020.01)

(52) U.S. Cl.
  CPC ........ *G01S 13/4418* (2013.01); *G01S 13/931* (2013.01)

(58) Field of Classification Search
  CPC .... H01Q 1/525; H01Q 1/3233; H01Q 21/065; G01S 13/42; G01S 13/931; G01S 13/4418; G01S 13/4427; G01S 13/4454
  See application file for complete search history.

(56) References Cited

U.S. PATENT DOCUMENTS

| | | | |
|---|---|---|---|
| 5,815,112 A * | 9/1998 | Sasaki .................. | H01Q 21/22 342/175 |
| 11,874,363 B2 * | 1/2024 | Lee ........................... | G01S 7/41 |
| 12,148,988 B2 * | 11/2024 | Goda ..................... | G01S 13/584 |
| 2016/0209504 A1 * | 7/2016 | Steinhauer ............... | G01S 3/44 |
| 2019/0187268 A1 * | 6/2019 | Lien ....................... | G01S 13/422 |
| 2019/0195984 A1 * | 6/2019 | Goda ..................... | G01S 13/931 |
| 2019/0391230 A1 * | 12/2019 | Loesch ................... | G01S 13/42 |
| 2025/0155570 A1 * | 5/2025 | Wu ........................ | G01S 13/931 |

FOREIGN PATENT DOCUMENTS

KR   10-2020-0047411 A   5/2020

OTHER PUBLICATIONS

Korean Office Action issued on Oct. 1, 2024, in connection with the Korean Patent Application No. 10-2021-0160526, with its English translation, 12 pages.

* cited by examiner

Primary Examiner — Tung X Le
(74) Attorney, Agent, or Firm — Hauptman Ham, LLP

(57) ABSTRACT

The embodiments relate to a radar control device and method. Specifically, a radar control device according to the embodiments may include an antenna device comprising a non-uniform linear array (NLA) antennas spaced apart according to a predetermined ratio, a first uniform linear array (ULA) antenna generated by being spaced apart by a first interval based on the NLA antenna, and a second ULA antenna generated by being spaced apart by a second interval based on the NLA antenna, a transceiver configured to transmit a transmission signal through the antenna device and receive a reflection signal reflected from an object, and a controller configured to determine an angular power spectrum (APS) for the reflection signal and determine an angle at which the object is located based on the APS.

20 Claims, 10 Drawing Sheets

RADAR CONTROL DEVICE AND METHOD

CROSS REFERENCE TO RELATED APPLICATION

This application claims priority from Korean Patent Application No. 10-2021-0160526, filed on Nov. 19, 2021, which is hereby incorporated by reference for all purposes as if fully set forth herein.

TECHNICAL FIELD

The embodiments of the present disclosure relate to a radar control device and method.

Recently, the number of vehicles equipped with radar is increasing. An electronic control unit of the vehicle may calculate the distance, relative speed, and angle between the host vehicle and an object around the host vehicle based on the information output from the radar mounted on the vehicle.

The vehicle equipped with a radar may provide various safety functions or convenience functions by using the distance, relative speed, and angle between the host vehicle and an object around the host vehicle.

However, the angular resolution of a radar mounted on a vehicle improves as the size of the opening increases, and the number of antennas of the radar may be limited according to the size of the opening. Accordingly, in the case that the limited number of antennas is disposed within the limited opening, the performance of the radar may be deteriorated due to the increase of the separation of the antennas.

SUMMARY

In this background, embodiments of the present disclosure provide a radar control device and method capable of generating a virtual antenna through a non-uniform linear array (NLA) antenna arranged at a predetermined ratio.

In an aspect of the present disclosure, there is provided a radar control device including an antenna device comprising a non-uniform linear array (NLA) antennas spaced apart according to a predetermined ratio, a first uniform linear array (ULA) antenna generated by being spaced apart by a first interval based on the NLA antenna, and a second ULA antenna generated by being spaced apart by a second interval based on the NLA antenna, a transceiver configured to transmit a transmission signal through the antenna device and receive a reflection signal reflected from an object, and a controller configured to determine an angular power spectrum (APS) for the reflection signal and determine an angle at which the object is located based on the APS.

In another aspect of the present disclosure, there is provided a radar control method including transmitting a transmission signal through a non-uniform linear array (NLA), a first uniform linear array (ULA) antenna and a second ULA antenna generated based on the NLA antenna, and receiving reflection signals reflected from an object, determining an angular power spectrum (APS) for each of the reflection signals, and determining an angle at which the object is located based on the APS determined.

According to embodiments of the radar control device and method according to the present disclosure, it is possible to more accurately detect an object by generating two ULA antennas from an NLA antenna.

DETAILED DESCRIPTION

Figure 1:
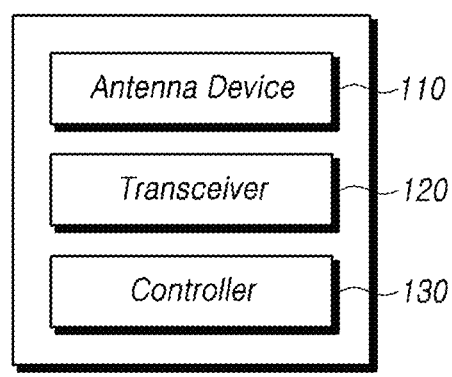
FIG. 1 is a block diagram illustrating a radar control device according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, it will be described a radar control device according to an embodiment of the present disclosure with reference to the accompanying drawings.

FIG. 1 is a block diagram illustrating a radar control device 10 according to an embodiment of the present disclosure.

A radar control device 10 according to an embodiment of the present disclosure may include an antenna device 110, a transceiver 120 and a controller 130.

The radar control device 10 according to an embodiment of the present disclosure may be an advanced driver assistance systems (ADAS) which is mounted on a host vehicle and provides information to assist the driving of the host vehicle or provides assistance to the driver in controlling the host vehicle 20.

Here, ADAS may refer to various types of advanced driver assistance systems, and examples of the driver assistance systems may include, for example, an autonomous emergency braking (AEB), a smart parking assistance system (SPAS), a blind spot detection (BSD) system, an adaptive cruise control (ACC) system, a lane departure warning system (LDWS), a lane keeping assistance System (LKAS), a lane change assistance system (LCAS), and the like. However, the present disclosure is not limited thereto.

Here, the host vehicle may refer to a vehicle capable of moving on the ground without using a railroad or a built-in line by mounting a prime mover and rolling wheels with the power. The host vehicle may be an electric vehicle which is powered by electricity, and obtains driving energy by rotating a motor with electricity accumulated in a battery rather than obtaining driving energy from combustion of fossil fuels.

The radar control device 10 may be applied to a manned vehicle controlled by a driver of the host vehicle or an autonomous vehicle that automatically travels without driver intervention.

The radar control device 10 may generate a virtual antenna through a multiple-input-multiple-output (MIMO) system.

The antenna device 110 may include a non-uniform linear array (NLA) antenna arranged to be spaced apart according to a predetermined ratio, a first uniform linear array (ULA) antenna generated by being spaced apart by a first interval based on the NLA antenna 210 and a second ULA antenna 230 generated by being spaced apart by a second interval based on the NLA antenna 210.

Figure 2:
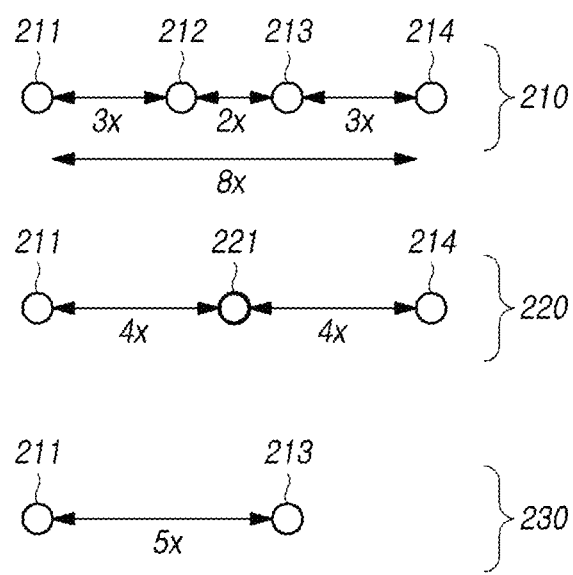
FIG. 2 is a diagram for describing an NLA antenna, a first ULA antenna, and a second ULA antenna generated by the NLA antenna according to an embodiment.

FIG. 2 is a diagram for describing an NLA antenna 210, a first ULA antenna 220 and a second ULA antenna 230 generated by the NLA antenna according to an embodiment.

Referring to FIG. 2, in one embodiment, the NLA antenna 210 may include a first RX antenna 211, a second RX antenna 212 and a third RX antenna 213 and the fourth RX antenna 214 which are disposed spaced apart in a 3:2:3 ratio.

In addition, the first ULA antenna 220 may include the first RX antenna 211, a first virtual antenna 221, and the fourth RX antenna 214. That is, the radar control device 10 may generate the first ULA antenna 220 comprising a first virtual antenna 221 using the first RX antenna 211 and the fourth RX antenna 214 included in the NLA antenna 210. Here, the first virtual antenna 221 may be disposed between the first RX antenna 211 and the fourth RX antenna 214.

In addition, the second ULA antenna 230 may include the first RX antenna 211 and the third RX antenna 213. The radar control device 10 may generate the second ULA antenna 230 using the first RX antenna 211 and the third RX antenna 213 included in the NLA antenna 210.

Here, the X of FIG. 2 is a term that means the ratio of the NLA antenna 210, which may be natural or integer. In addition, the interval between the RX antennas may be defined as lambda ($\lambda$). The X and the interval between and RX antenna described above may also be applied to descriptions by other drawings below.

Figure 3:
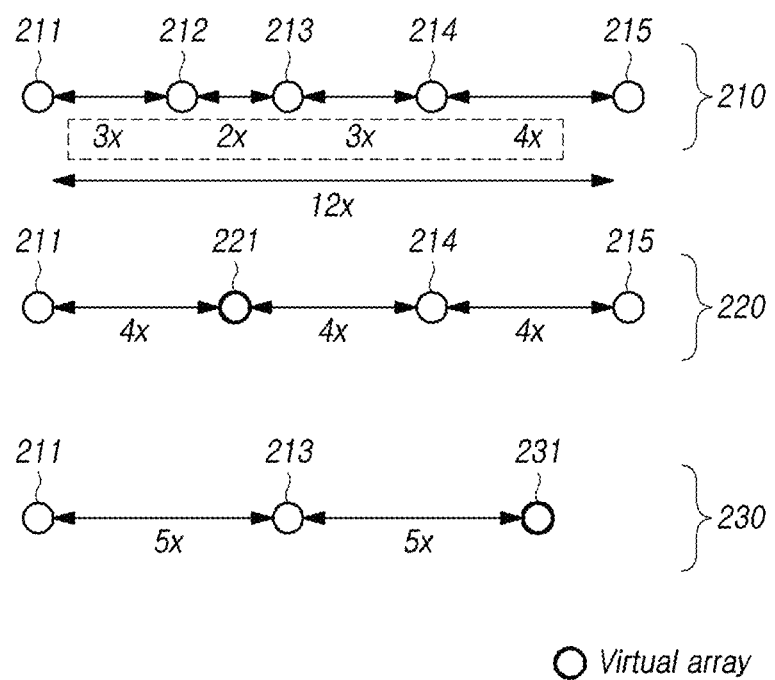
FIG. 3 is a diagram for describing an NLA antenna, a first ULA antenna, and a second ULA antenna generated by the NLA antenna according to another embodiment.

FIG. 3 is a diagram for describing an NLA antenna 210, a first ULA antenna 220 and a second ULA antenna 230 generated by the NLA antenna according to another embodiment.

Referring to FIG. 3, the NLA antenna 210 may further include a fifth RX antenna 215 spaced apart in a 3:2:3:4 ratio. That is, the NLA antenna 210 includes a first RX antenna 211, a second RX antenna 212, a third RX antenna 213, a fourth RX antenna 214 and a fifth RX antenna 215. In addition, the intervals between these Rx antennas may be a 3:2:3:4 ratio.

By using the NLA antenna 210 disposed in the above-mentioned ratio, the first ULA antenna 220 further includes a fifth RX antenna 215, and the second ULA antenna 230 may further include a second virtual antenna 231.

Accordingly, the radar control device 10 may generate the first ULA antenna 220 uniformly disposed while including the first virtual antenna 221 by using the first RX antenna 211, the fourth RX antenna 214 and the fifth RX antenna 215. The interval between each antenna included in the first ULA antenna 220 may be, for example, 4$\lambda$.

In addition, the radar control device 10 utilizes the first RX antenna 211 and the third RX antenna 213 to generate a second ULA antenna 230 having an equal interval between the antennas with a second virtual antenna 231. Here, the second virtual antenna 231 may be disposed on the right side of the third RX antenna 213. The interval between each antenna included in the second ULA antenna 230 may be, for example, 5$\lambda$.

Figure 4:
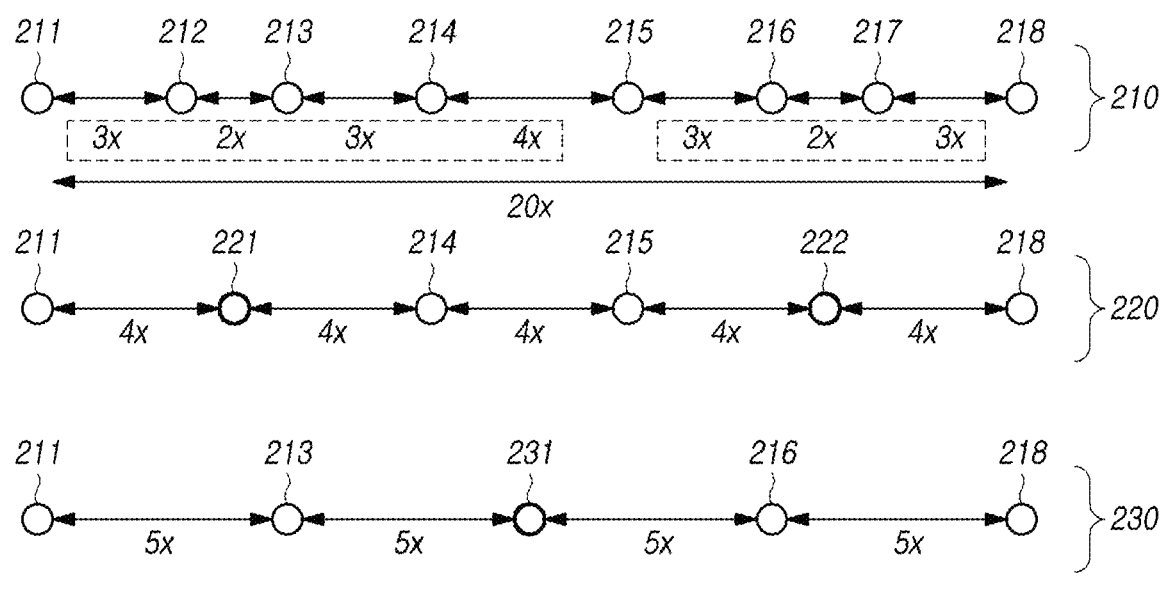
FIG. 4 is a diagram for describing a first ULA antenna and a second ULA antenna generated by an NLA antenna according to another embodiment.

FIG. 4 is a diagram for describing a first ULA antenna 220 and a second ULA antenna 230 generated by an NLA antenna 210 according to another embodiment.

Referring to FIG. 4, the NLA antenna 210 may include a first RX antenna 211, a second RX antenna 212, a third RX antenna 213, a fourth RX antenna 214, a fifth RX antenna 215, a sixth RX antenna 216, a seventh RX antenna 217 and an eighth RX antenna 218 which are spaced apart in a ratio of 3:2:3:4:3:2:3.

In the case of the arrangement of the NLA antenna 210 of FIG. 4, there may be generated a first ULA antenna 220 and a second ULA antenna 230 having the same shape as those in which FIGS. 2 and 3 are continuously connected. Specifically, the first ULA antenna 220 may be generated by utilizing the first RX antenna 211, the fourth RX antenna 214, the fifth RX antenna 215 and the eighth RX antenna 218. The first ULA antenna 220 may include a first virtual antenna 221 generated using the NLA antenna 210 of FIG. 3 and a third virtual antenna 222 generated using the NLA antenna 210 of FIG. 2. That is, the first ULA antenna 220 may include, like the first ULA antenna 220 of FIG. 3 generated by the NLA antenna 210 of FIG. 3, a first RX antenna 211, a first virtual antenna 221, a fourth RX antenna 214 and a fifth RX antenna 215. In addition, the first ULA antenna 220 may further include, like the first ULA antenna 220 of FIG. 2 generated by the NLA antenna 210 of FIG. 2, a third virtual antenna 222 and an eighth RX antenna 218. Here, as shown in FIG. 4, the interval between each antenna included in the first ULA antenna 220 may be 4×, for example, 4λ.

Similarly, the second ULA antenna 230 may have a shape in which the arrangement of the second ULA antenna 230 of FIG. 3 and the arrangement of the second ULA antenna 230 of FIG. 2 are sequentially arranged. Accordingly, the second ULA antenna 230 may include the first RX antenna 211, the third RX antenna 213, the second virtual antenna 231, the sixth RX antenna 216 and the eighth RX antenna 218. Here, as shown in FIG. 4, the interval between each antenna included in the second ULA antenna 230 may be 5×, for example, 5λ.

Figure 5:
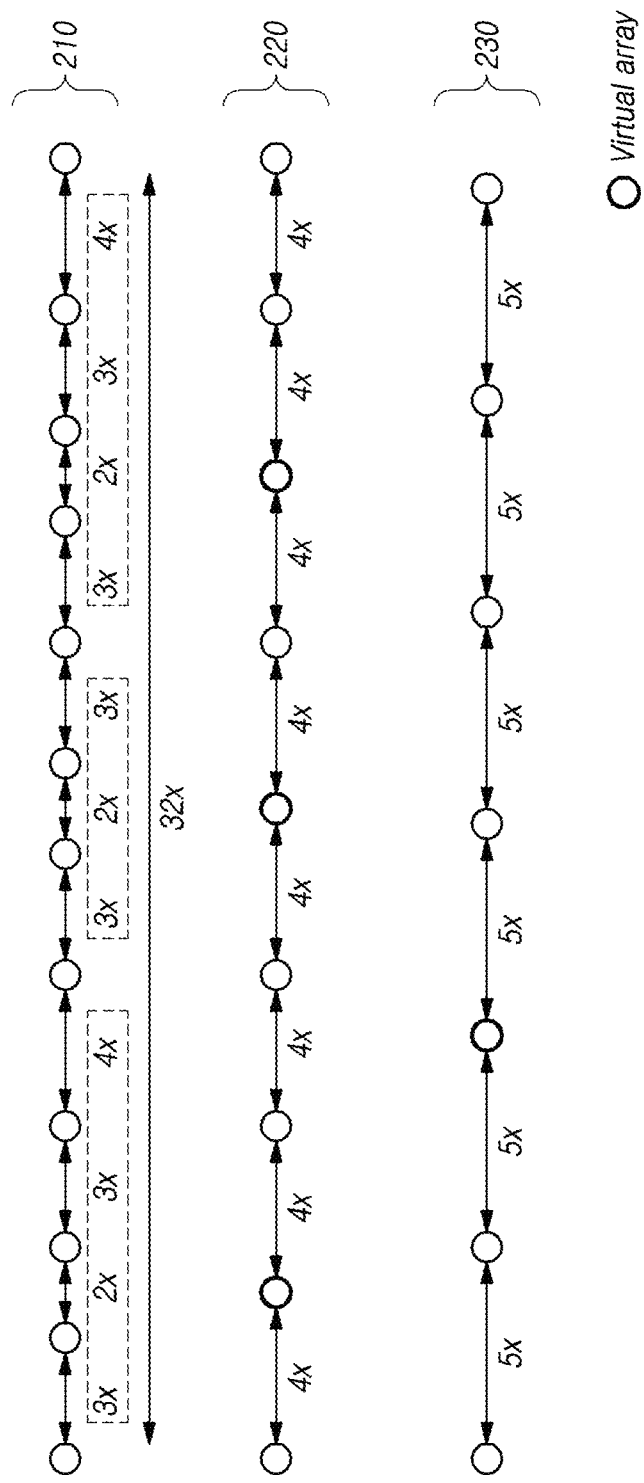
FIGS. 5 and 6 are diagrams for explaining the NLA antennas alternately arranged at the NLA antenna interval of FIG. 2 and the NLA antenna interval of FIG. 3, and a first ULA antenna and a second ULA antenna generated through this manner.
Figure 6:
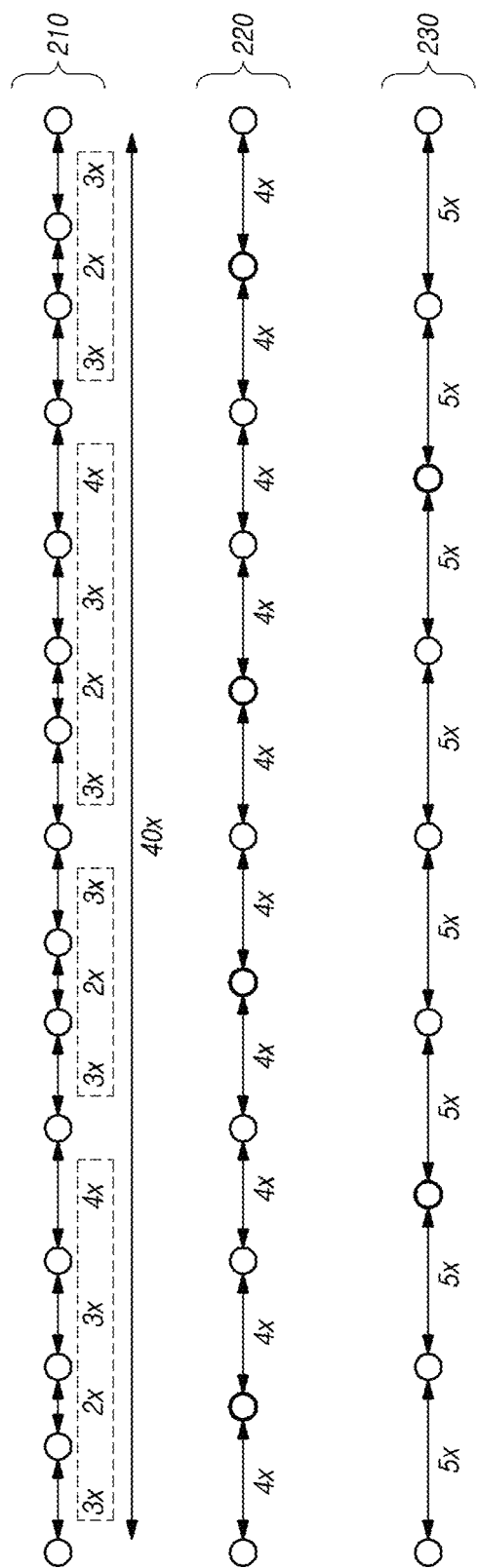

FIGS. 5 and 6 are diagrams for explaining the NLA antennas 210 alternately arranged at the NLA antenna interval of FIG. 2 and the NLA antenna interval of FIG. 3, and a first ULA antenna 220 and a second ULA antenna 230 generated through this manner.

Referring to FIG. 5, the NLA antenna 210 of FIG. 5 may be one NLA antenna 210 in which the NLA antenna 210 of FIG. 3, the NLA antenna 210 of FIG. 2, and the NLA antenna 210 of FIG. 3 are continuously arranged. The first ULA antenna 220 and the second ULA antenna 230 generated by the NLA antenna 210 of FIG. 5, as in FIG. 4, may have an arrangement shape which is the same as the ULA antenna arrangement of FIG. 2 and the ULA antenna arrangement of FIG. 3 constituting the NLA antenna 210 of FIG. 5.

Therefore, the first ULA antenna 220 may be generated in the form of the first ULA antenna 220 of FIG. 3 and the first ULA antenna 220 of FIG. 2 are alternately disposed. In addition, the second ULA antenna 230 may also be a shape in which the second ULA antenna 230 of FIG. 3 and the second ULA antenna 230 of FIG. 2 are alternately arranged. Accordingly, three virtual antennas of the first ULA antenna 220 may be generated, and two virtual antennas of the second ULA antenna 230 may be generated.

Referring to FIG. 6, the NLA antenna 210 of FIG. 6 may have a structure in which the NLA antenna 210 of FIG. 3 and the NLA antenna 210 of FIG. 2 are alternately arranged twice.

In the case of FIG. 6, as in the case of FIG. 5, the arrangement of the NLA antenna 210 of FIG. 6 may be divided into the arrangement of the NLA antenna 210 of FIG. 3 and the arrangement of the antenna of FIG. 2, and The first ULA antenna 220 and the second ULA antenna 230 of FIG. 6 may be generated in a structure corresponding to each antenna arrangement. Accordingly, four virtual antennas of the first ULA antenna 220 may be generated, and two virtual antennas of the second ULA antenna 230 may be generated.

As described above, the radar control device 10 according to an embodiment of the present disclosure may generate two ULA antennas from one NLA antenna 210, thereby more accurately detecting the position of an object.

The transceiver 120 may transmit a transmission signal through the antenna device 110 and receive a reflection signal reflected from an object.

The antenna device 110 may include one or more transmission antennas and one or more receiving antennas, and each transmission/receiving antenna may be an array antenna in which one or more radiating elements are connected in series by a feed line, but is not limited thereto.

The antenna device 110 may include a plurality of transmission antennas and a plurality of receiving antennas, and may have various types of antenna array structures according to an arrangement order and an arrangement interval thereof.

In an embodiment, if the antenna device 110 includes one transmission antenna and one receiving antenna, respectively, the transmission antenna may include a first transmission channel and a second transmission channel, and the receiving antenna may include a first receiving channel and a second receiving channel.

In another embodiment, if the antenna device 110 includes a plurality of transmission antenna and receiving antenna, respectively, the first transmission antenna may include a first transmission channel and the second transmission antenna may include a second transmission channel. The first receiving antenna may include a first receiving channel, and the second receiving antenna may include a second receiving channel.

The transceiver 120 may provide a function of transmitting a transmission signal through a switched transmission antenna by switching to one of a plurality of transmission antennas included in the antenna device 110 or transmitting a transmission signal through a multi-transmission channel allocated to the plurality of transmission antennas.

The transceiver 120 may include an oscillator for generating a transmission signal for one transmission channel allocated to the switched transmission antenna or multi-transmission channels to allocated a plurality of transmission antennas. The oscillator may include, for example, a voltage-controlled oscillator (VCO) and an oscillator The transceiver 120 may receive a reception signal received by being reflected from an object through a receiving antenna.

In addition, the transceiver 120 may provide a function of receiving a reception signal, which is a reflection signal of the transmission signal reflected by a target, through the switched receiving antenna by switching to one of a plurality of receiving antennas, or a function of receiving a reception signal through multi-receiving channels allocated to a plurality of receiving antennas.

The transceiver 120 may include a low-noise amplifier (LNA) for low-noise amplification of a reception signal received through one receiving channel allocated to the switched receiving antenna or received through a multi-receiving channel allocated to a plurality of receiving antennas, a mixer for mixing the low-noise amplified reception signal, an amplifier for amplifying the mixed reception signal, and a converter (e.g., an analog digital converter) for digitally converting the amplified reception signal to generate reception data.

Referring to FIG. 1 again, the controller 130 may determine an APS for the received reflection signal, and determine an angle at which an object is located based on the APS.

In one embodiment, the controller 130 may determine an angle where an object is located in an overlapping area between the APS of the first ULA antenna 220 and the APS of the second ULA antenna 230.

Figure 7:
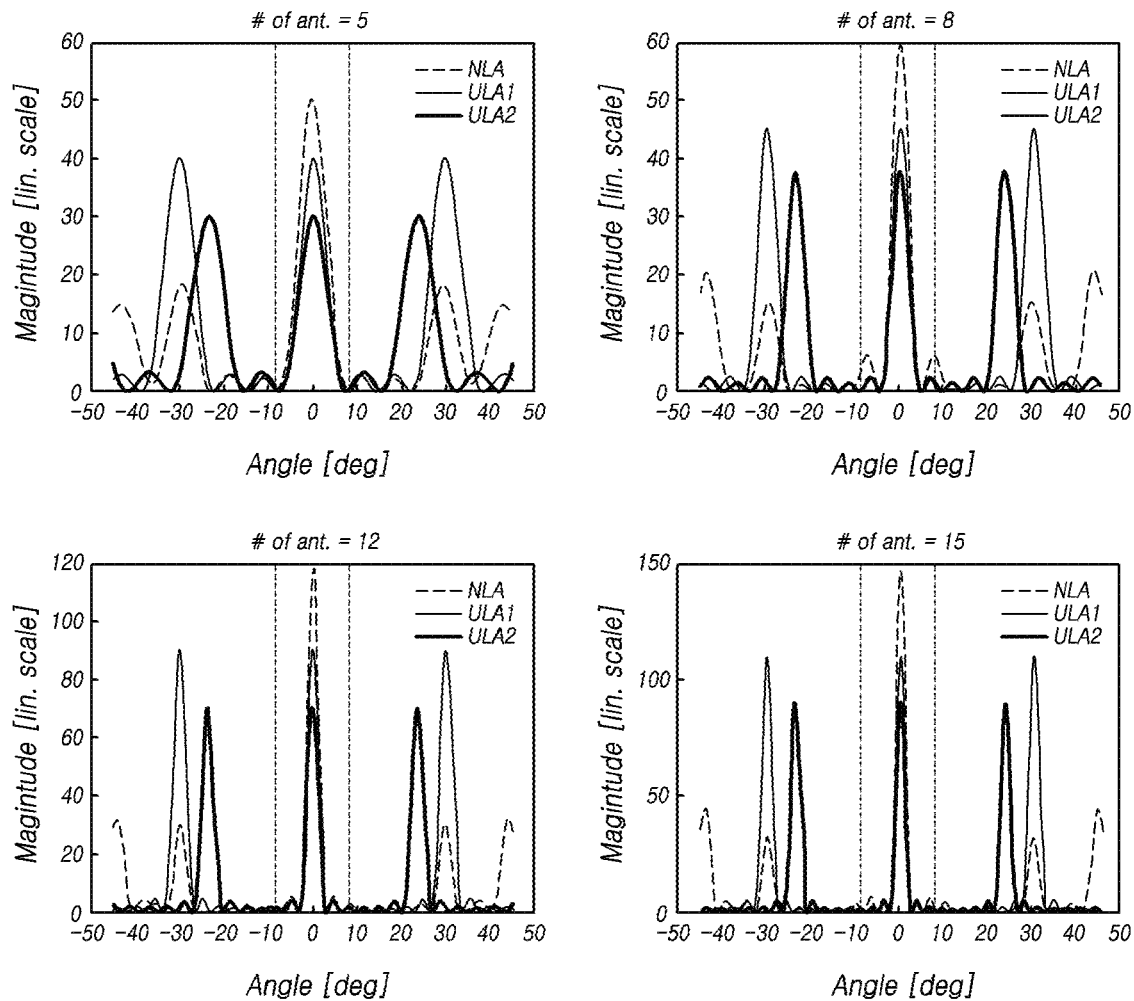
FIG. 7 illustrates APSs of an NLA antenna, a first ULA antenna, and a second ULA antenna according to an embodiment.

FIG. 7 illustrates APSs of an NLA antenna 210, a first ULA antenna 220, and a second ULA antenna 230 according to an embodiment.

Referring to FIG. 7, the controller 130 may determine an angle at which an object is located through the APS of the NLA antenna 210, the first ULA antenna 220, and the second ULA antenna 230. Each curve indicates the peak value of the power of the signal received by the antenna from a particular angle. In addition, if the peak power at a particular angle is calculated higher than the surrounding angle, the controller 130 may determine that the object is located at the corresponding angle. In addition, as shown in FIG. 7, if there are a plurality of peaks with high power, the angle at which the object is located may be determined by additionally considering the APS of another antenna. In an ideal case, the angle corresponding to the highest peak power in each antenna may be equally calculated as 0 degrees as shown in FIG. 7. In addition, as the number of antennas forming the NLA antenna 210, the first ULA antenna 220 and the second ULA antenna 230 increases, the angle at which the object is located may be more accurately estimated.

Figure 8:
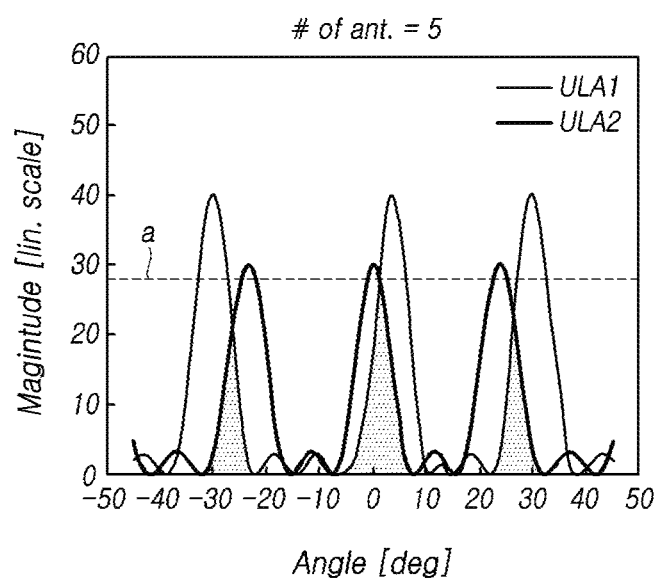
FIG. 8 is a diagram for explaining determining an angle at which an object is located through an APS of an antenna according to an embodiment.

FIG. 8 is a diagram for explaining determining an angle at which an object is located through an APS of an antenna according to an embodiment.

The controller 130 may determine an angle corresponding to the highest peak power value in the overlapping area as an angle at which the object is located.

Referring to FIG. 8, for example, an overlapping area in the APS of the first ULA antenna 220 and the second ULA antenna 230 is displayed in shade. Here, the controller 130 may determine an angle corresponding to 'a' of FIG. 8, which is the highest peak power value, as an angle at which the object is located. In addition, the controller 130 may further determine the APS for the NLA antenna 210, and may determine an angle corresponding to the highest peak power value in overlapping area of the APS of the NLA antenna 210, the first ULA antenna 220 and the second ULA antenna 230 as an angle at which the object is located.

Figure 9:
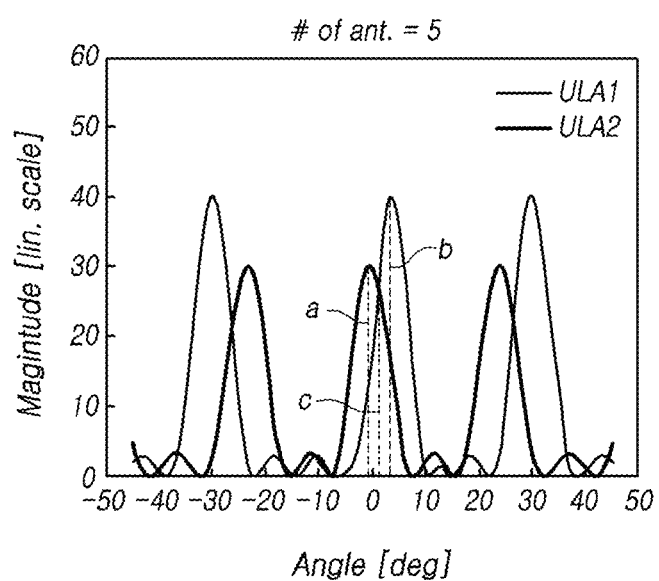
FIG. 9 is a diagram for explaining determining an angle at which an object is located through an APS of an antenna according to another embodiment.

FIG. 9 is a diagram for explaining determining an angle at which an object is located through an APS of an antenna according to another embodiment.

Referring to FIG. 9, if an angle corresponding to the highest peak power value in the APS of the first ULA antenna 220 and an angle corresponding to the highest peak power value in the APS of the second ULA antenna 230 are less than or equal to a predetermined angle, the controller 130 may determine an intermediate value between the angle corresponding to the highest peak power value of the first ULA antenna 220 and an angle corresponding to the highest peak power value of the second ULA antenna 230 as the angle at which the object is located.

Accordingly, in FIG. 9, if a difference between an angle 'a' corresponding to the highest peak power value of the first ULA antenna 220 and an angle 'b' corresponding to the highest peak power value of the second ULA antenna 230 is equal to or less than a predetermined angle, the controller 130 may determine 'c', which is an intermediate value between 'a' and 'b', as the angle at which the object is located.

In addition, the controller 130 may further determine the APS for the NLA antenna 210. If a difference between the angle corresponding to the highest peak power value of the NLA antenna 210, the angle corresponding to the highest peak value of the first ULA antenna 220 and the angle corresponding to the highest peak power value of the second ULA antenna 230 is less than or equal to a predetermined angle, the controller may determine an average value of the three angles described above as the angle at which the object is located.

As described above, the radar control device 10 according to an embodiment of the present disclosure may determine the position of the object in consideration of the peak powers of two ULA antennas, thereby performing more accurate object detection.

The radar control device 10 may be implemented as an electronic control unit (ECU), a microcomputer, or the like.

For example, an electronic control unit (not shown) of the radar control device 10 may include at least one or more elements of one or more processors, memories, storage unit, user interface input unit and user interface output unit, which may communicate with each other via a bus. Furthermore, the electronic control unit may also comprise a network interface for connecting to the network. The processor may be a CPU or a semiconductor device that executes processing instructions stored in memory and/or storage unit. Memory and storage unit may include various types of volatile/non-volatile storage media. For example, memory may include ROM and RAM.

Hereinafter, it will be described a radar control method using the radar control device 10 capable of performing all of the above-described present disclosure.

Figure 10:
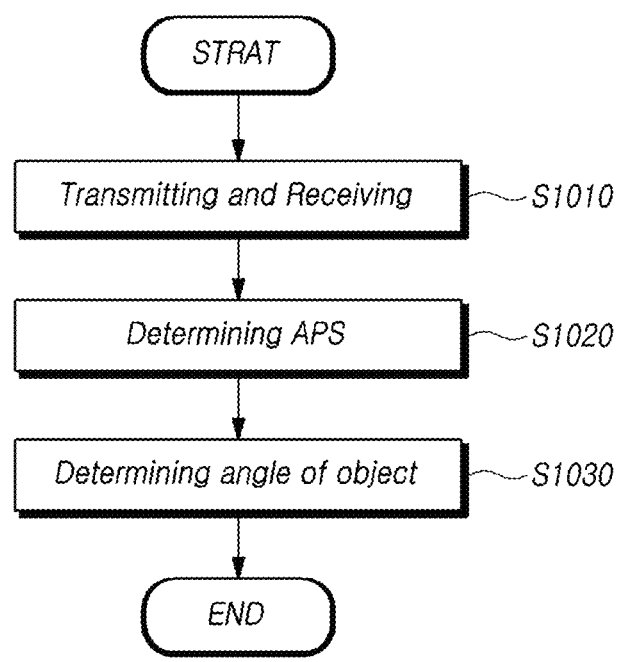
FIG. 10 is a flowchart illustrating a radar control method according to an embodiment of the present disclosure.

FIG. 10 is a flowchart illustrating a radar control method according to an embodiment of the present disclosure.

Referring to FIG. 10, the radar control method according to an embodiment of the present disclosure may include a transmitting/receiving step S1010 of transmitting a transmission signal through the first ULA antenna 220 and the second ULA antenna 230 generated based on the NLA antenna 210 and receiving the reflection signal reflected from the object, an APS determination step S1020 of calculating APS for the reflection signals, respectively, and an object position determination step S1030 of calculating the angle at which the object is located based on the determined APS.

In an embodiment, the NLA antenna 210 may include a first RX antenna 211, a second RX antenna 212, a third RX antenna 213, and a fourth RX antenna 214 which are spaced apart from each other in a 3:2:3 ratio. In addition, the first ULA antenna 220 may include the first RX antenna 211, a first virtual antenna 221 and the fourth RX antenna 214, and the second ULA antenna 230 may include the first RX antenna 211 and the third RX antenna 213. The first virtual antenna 221 may be disposed between the first RX antenna 211 and the fourth RX antenna 214.

In another embodiment, the NLA antenna 210 may further include a fifth RX antenna 215 arranged to be spaced apart in a 3:2:3:4 ratio. In addition, the first ULA antenna 220 may further include the fifth RX antenna 215, and the second ULA antenna 230 may further include a second virtual antenna 231. The second virtual antenna 231 may be disposed on the right side of the third RX antenna 213.

In the object position determination step S1030, an angle at which the object is located may be determined in an overlapping area between an APS of the first ULA antenna 220 and an APS of the second ULA antenna 230. In addition, in the object position determination step S1030, an angle corresponding to the highest peak power value among overlapping area between the APS of the first ULA antenna 220 and the APS of the second ULA antenna 230 may be determined as the angle at which the object is located.

In the object position determination step S1030, if a difference between an angle corresponding to the highest peak power value in the APS of the first ULA antenna 220 and an angle corresponding to the highest peak power value in the APS of the second ULA antenna 230 is less than or equal to a predetermined angle, an intermediate value between the angle corresponding to the highest peak power value of the first ULA antenna 220 and an angle corresponding to the highest peak power value of the second ULA antenna 230 may be determined as the angle at which the object is located.

As described above, according to the present disclosure, the radar control device and method may more accurately estimate the angle of the position of the object by determining the grating lobe of the ULA antenna.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A radar control device comprising:
   an antenna device comprising a non-uniform linear array (NLA) antennas spaced apart according to a predetermined ratio, a first uniform linear array (ULA) antenna generated by being spaced apart by a first interval based on the NLA antenna, and a second ULA antenna generated by being spaced apart by a second interval based on the NLA antenna;
   a transceiver configured to transmit a transmission signal through the antenna device and receive a reflection signal reflected from an object; and
   a controller configured to determine an angular power spectrum (APS) for the reflection signal and determine an angle at which the object is located based on the APS.

2. The radar control device of claim 1, wherein the NLA antenna comprises a first receiving (RX) antenna, a second RX antenna, a third RX antenna, and a fourth RX antenna which are spaced apart from each other in a 3:2:3 ratio.

3. The radar control device of claim 2, wherein the first ULA antenna comprises the first RX antenna, a first virtual antenna and the fourth RX antenna, and the second ULA antenna comprises the first RX antenna and the third RX antenna.

4. The radar control device of claim 3, wherein the first virtual antenna is disposed between the first RX antenna and the fourth RX antenna.

5. The radar control device of claim 2, wherein the NLA antenna further comprises a fifth RX antenna arranged to be spaced apart in a 3:2:3:4 ratio.

6. The radar control device of claim 5, wherein the first ULA antenna further comprises the fifth RX antenna, and the second ULA antenna further comprises a second virtual antenna.

7. The radar control device of claim 6, wherein the second virtual antenna is disposed on the right side of the third RX antenna.

8. The radar control device of claim 1, wherein the controller determines an angle at which the object is located in an overlapping area between an APS of the first ULA antenna and an APS of the second ULA antenna.

9. The radar control device of claim 8, wherein the controller determines an angle corresponding to the highest peak power value among overlapping area between the APS of the first ULA antenna and the APS of the second ULA antenna as the angle at which the object is located.

10. The radar control device of claim 1, wherein, if a difference between an angle corresponding to the highest peak power value in the APS of the first ULA antenna and an angle corresponding to the highest peak power value in the APS of the second ULA antenna is less than or equal to a predetermined angle, the controller determines an intermediate value between the angle corresponding to the highest peak power value of the first ULA antenna and an angle corresponding to the highest peak power value of the second ULA antenna as the angle at which the object is located.

11. A radar control method comprising:
    transmitting a transmission signal through a non-uniform linear array (NLA), a first uniform linear array (ULA) antenna and a second ULA antenna generated based on the NLA antenna, and receiving reflection signals reflected from an object;
    determining an angular power spectrum (APS) for each of the reflection signals; and
    determining an angle at which the object is located based on the APS determined.

12. The radar control method of claim 11, wherein the NLA antenna comprises a first receiving (RX) antenna, a second RX antenna, a third RX antenna, and a fourth RX antenna which are spaced apart from each other in a 3:2:3 ratio.

13. The radar control method of claim 12, wherein the first ULA antenna comprises the first RX antenna, a first virtual antenna and the fourth RX antenna, and the second ULA antenna comprises the first RX antenna and the third RX antenna.

14. The radar control method of claim 13, wherein the first virtual antenna is disposed between the first RX antenna and the fourth RX antenna.

15. The radar control method of claim 12, wherein the NLA antenna further comprises a fifth RX antenna arranged to be spaced apart in a 3:2:3:4 ratio.

16. The radar control method of claim 15, wherein the first ULA antenna further comprises the fifth RX antenna, and the second ULA antenna further comprises a second virtual antenna.

17. The radar control method of claim 16, wherein the second virtual antenna is disposed on the right side of the third RX antenna.

18. The radar control method of claim 11, wherein the determining an angle comprises determining an angle at which the object is located in an overlapping area between an APS of the first ULA antenna and an APS of the second ULA antenna.

19. The radar control method of claim 18, wherein the determining an angle comprises determining an angle corresponding to the highest peak power value among overlapping area between the APS of the first ULA antenna and the APS of the second ULA antenna as the angle at which the object is located.

20. The radar control method of claim 11, wherein the determining an angle comprises, if a difference between an angle corresponding to the highest peak power value in the APS of the first ULA antenna and an angle corresponding to the highest peak power value in the APS of the second ULA antenna is less than or equal to a predetermined angle, determining an intermediate value between the angle corresponding to the highest peak power value of the first ULA antenna and an angle corresponding to the highest peak power value of the second ULA antenna as the angle at which the object is located.

* * * * *